Patented Jan. 30, 1940

2,188,770

UNITED STATES PATENT OFFICE 2,188,770

TREATMENT OF OIL

Harold Jay Robertson, Tulsa, Okla., assignor to Sinclair Refining Company, New York, N. Y., a corporation of Maine No Drawing. Application November 20, 1937, Serial No. 175,608

10 Claims. (Cl. 260—504)

This invention relates to an improved process for the production of mineral oil sulfonic acids or sulfonates by the treatment of petroleum or mineral oil, or suitably selected fractions or distillates thereof, with a sulfonating agent such as fuming sulfuric acid or oleum, with subsequent separation of the mineral oil or petroleum sulfonic acids, unreacted oil and unreacted acid. It relates more particularly to improvements in such processes which greatly improve the yields of the desired sulfonic acids or sulfonates from the raw materials used by permitting more drastic treatment of the mineral oil stock and more efficient separation and recovery of the reaction products.

Mineral oil sulfonates are commonly produced by the treatment of non-volatile petroleum or mineral oils with fuming sulfuric acid or oleum, after such stock has been preliminarily subjected to an acid refining with ordinary concentrated sulfuric acid to remove water, carbon, unsaturates, etc. In ordinary operations, the temperature during the sulfonation is carefully controlled, and maintained at about 100 to 105° F., or lower, with slow addition of the oleum to the oil, to avoid undue polymerization of the sulfonic acids produced, with the production of polymerized products which tend to form emulsions with the oil and the sulfuric acid which are extremely difficult to separate. It has been customary to conduct the sulfonation under such carefully controlled conditions of temperature and to limit the time of the sulfonation to a relatively short time, to prevent the polymerization and to avoid the necessity of expensive treatment for the removal of the sulfonic acids from the excess sulfuric acid, as by the addition of alcohol, acetone, or the like, to the completely neutralized mixture of sulfonic and sulfuric acids, with precipitation of the sulfates.

The present invention, which provides more efficient and complete separation of the reaction products of the sulfonation, permits the reaction to be carried out at higher temperatures, or over longer periods of time, or both, with increased yields of the desired sulfonic acids, the separation of the sulfonic acids from the sulfuric acid and the unreacted oil being substantially complete despite the greater degree of sulfonation.

In ordinary practice, the mineral oil to be sulfonated, after pretreatment with concentrated sulfuric acid, is subjected to the action of fuming sulfuric acid at temperatures in the neighborhood of 100 to 105° F., for a period of time ranging from 45 minutes to one hour, after which the product is allowed to stand and separate into two layers, the upper containing unreacted oil and the lower the sulfonic acids, or at least the larger part of the sulfonic acids, and the sulfuric acid. These layers are separated, and the sludge (lower) layer, containing the major portion of the sulfonic acids, is washed either with water or salt solution, and is again allowed to stand. It stratifies into a dilute sulfuric acid layer, which will contain the salt if a salt solution is used for washing, a middle layer containing the sulfonic acids, and perhaps a third layer containing unreacted oil. The layer containing the sulfonic acids is then separated, and usually is neutralized with ammonia or other alkaline material to form the mineral oil sulfonates of commerce.

In accordance with the present invention, the sulfonation of the acid treated mineral oil may be carried out at temperatures ranging up as high as 130° F., and for periods of time ranging up to three hours, oleum or fuming sulfuric acid being used for the sulfonation. After the sulfonation is completed, the entire mass is subjected to a washing operation with a relatively dilute solution of an alkaline material, such as caustic soda or aqua ammonia, the amount of alkaline material being sufficient to neutralize only a small part of the excess acid.

As the reaction between the alkaline material and the acid is exothermic, and as the addition of the water in the solution results in evolution of heat, it is advantageous to first add a relatively small quantity of water, generally not more than 25% by weight based on the oleum, to prevent too rapid a rise in temperature and to add the alkaline solution after such addition of water. The total amount of water, including that added as such, if any, and that contained in the alkaline solution, may be varied over a relatively wide range. About 74 to 80% by weight based on the oleum generally is sufficient to give very satisfactory results. As stated, the amount of alkaline material used is sufficient to neutralize but a small part of the excess sulfuric acid. An amount corresponding to about one pound of caustic soda for each twenty to twenty-two pounds of oleum gives very satisfactory results, but this amount may, of course, be varied.

The addition of water and alkaline solution will result in an increase in the temperature of the reaction mass, which should be controlled to prevent a rise in temperature to the point where decomposition of the sulfonic acids takes place, and the temperature, during such addition, may be permitted, for example, to rise to about 165–170° F. but should not exceed about 200° F. as at these high temperatures decomposition of the sulfonic acids may occur. After the addition of the water and the alkaline solution, and agitation of the mass at relatively high temperatures, for example, around 170 to 190° F. for a short period, the emulsion or mixture breaks, with separation of the sulfonic acid sludge, this break being apparent from the changed appearance of the mass. At this time, the agitation is stopped, and the mass allowed to settle, either in the sulfonation vessel or in a separate settling vessel, with maintenance of a relatively high temperature, for example, around 180 to 190° F. during the settling. A very satisfactory separation takes place in about twelve hours, with the formation of three layers. The top layer consists of unreacted oil, the middle layer of the desired sulfonic acids, and the bottom layer of weak sulfuric acid and sulfate. The top layer, consisting mainly of unreacted oil, contains some oil soluble sulfonic acids, and may be extracted with aqueous alcohol or acetone for recovery of these acids.

The middle layer contains the sulfonic acids in a state of commercial purity and may be introduced into appropriate containers, but is usually neutralized with a suitable alkaline material, such as caustic soda, caustic potash, soda ash, ammonia, etc. The mineral oil sulfonate so obtained contains very small amounts of sulfates or unsulfonated oil in comparison with the substantial quantities of these materials found in ordinary commercial mineral oil sulfonates produced by prior processes. The use of higher temperatures in the sulfonation, or the continuance of the sulfonation for longer periods of time than are commonly used, does not affect the quality of the sulfonic acids obtained, nor does it render difficult the separation of the sulfonic acids from the reaction product. As higher temperatures and longer periods of sulfonation may be used, the yield of sulfonic acids is increased.

Separation of the sulfonic acids, unreacted oil and sulfuric acid from the reaction product may be effected by washing the entire reaction product with water or salt solution, or by carrying out an initial settling and decantation with separation of the unreacted oil and the sludge layer containing most of the sulfonic acids and the sulfuric acid, followed by settling, with separation of the reaction product into three layers, the upper containing the unreacted oil, the middle containing most of the sulfonic acids, and the lower layer containing dilute sulfuric acid and, if a salt solution be used for the wash, the salt.

The process involving the subjecting of the reaction mass to a wash including dilute alkaline solution is applicable not only to the sulfonation of mineral oil, but also to the reaction product of the sulfonation of partially oxidized mineral oils, such as are produced by blowing a mineral oil with air or other oxygen containing gas at relatively high temperatures for a sufficient period of time to produce a partially oxidized product. In such case, the sulfonic acids obtained are those of partially oxidized mineral oils.

The invention will be illustrated by the following specific example, although it is not limited thereto.

*Example.*—A Gulf Coast lubricating oil distillate having an S. U. viscosity at 100° F. of about 400 seconds is treated with 10% by weight of 66° Bé. sulfuric acid, the final temperature of the treatment being about 130° F., to remove free carbon, unsaturated compounds, moisture and other impurities from the oil.

2432 pounds of the acid treated oil, having a gravity of 20.4° A. P. I., are introduced into a sulfonator and 1033 pounds of commercial 20% oleum are added over a period of about two and a quarter hours, either continuously or intermittently, with both mechanical and compressed air agitation. The sulfonator is cooled by a water jacket, the temperature of the reaction mixture being maintained from about 110° to about 125° F. Advantageously, the temperature is kept down to about 110° F. during the addition of the first third of the oleum, but is allowed to rise to about 125° F. during the addition of the remaining oleum. After the oleum is all added, the agitation is continued for a short period, for example 10 minutes, after which, with continued agitation and continued cooling, about 256 pounds of water are added followed by about 554 pounds of 11.6° Bé. caustic soda solution. The water is added first over a period of about 15 minutes after which the caustic soda solution is added over a similar period. During the addition of water the temperature is maintained at about 140° F., and during the addition of the caustic soda solution, it is allowed to rise to about 164° F., by shutting off the cooling water and introducing steam into the jacket if necessary. The compressed air agitation is stopped and mechanical agitation only is used during the rest of the process. The heating of the mass is continued for about 20 minutes, during which the temperature is raised to about 176° F. At this point, a distinct break occurs, the sludge particles assuming a flaky, granular appearance, while the oil becomes clear. The temperature is raised to about 187° F. and the mass is transferred to a glass-lined settling vessel, provided with a thermostatically controlled water jacket to maintain the temperature of the mass at 185° F. The product is allowed to settle for eighteen hours while maintained at this temperature, after which the oil layer at the top is decanted and the solution of weak sulfuric acid and sulfate is withdrawn from the bottom. The interface between the sulfonic acid layer and the layer of weak sulfuric acid and sulfate is quite sharp, showing substantially complete separation of the sulfonic acids from the sulfuric acid and sodium sulfate. The sulfonic acid layer is then drawn into a steel mixing vessel. The yield is approximately 55% by weight, calculated on the oil charged. The sulfonic acids are neutralized with ammonia. The neutralized product is quite clear and forms solutions in alcohol with no precipitation of salt.

The process of the foregoing example may be modified by permitting the reaction mass, after the sulfonation, to stratify into two layers, an upper layer of unreacted oil and a lower sludge layer, with separation of these layers and treatment of the sludge layer with water and dilute alkaline solution, and with subsequent stratification of this washed product into three layers, an upper layer containing a small amount of unreacted oil, a middle layer containing the major proportion of the sulfonic acids, and a lower layer containing weak sulfuric acid and sodium sulfate. This procedure has advantages when it is desired to preserve a light color in the unreacted oil by avoiding subjecting it to the continued high temperatures used in the washing and subsequent settling operations.

I claim:

1. The process of producing mineral oil sulfonic acids which comprises subjecting a mineral oil to sulfonation, adding to the reaction product, with agitation, an aqueous alkaline solution in an amount insufficient to neutralize the sulfuric acid in the reaction product and separating the sulfonic acids by stratification.

2. The process of producing mineral oil sulfonic acids which comprises subjecting a mineral oil to sulfonation, adding to the reaction product, with agitation, an aqueous alkaline solution containing sufficient basic material to neutralize but a minor portion of the sulfuric acid in the reaction product, and separating the sulfonic acids by stratification.

3. The process of producing mineral oil sulfonic acids which comprises subjecting mineral oil to sulfonation, adding water to the reaction product, with agitation, then adding an aqueous alkaline solution in an amount insufficient to neutralize the sulfuric acid in the reaction product, with continued agitation, and separating the sulfonic acids by stratification.

4. The process of producing mineral oil sulfonic acids which comprises subjecting mineral oil to sulfonation, adding water to the reaction product, with agitation, then adding an aqueous alkaline solution containing sufficient basic material to neutralize but a minor portion of the sulfuric acid in the reaction product, with continued agitation, and separating the sulfonic acids by stratification.

5. The process as in claim 1, in which the amount of alkaline material in the solution is equivalent to about one part of caustic soda for each twenty parts of sulfonating agent.

6. The process as in claim 3, in which the amount of alkaline material in the solution is equivalent to about one part of caustic soda for each twenty parts of sulfonating agent.

7. The process as in claim 1, in which the amount of water added to the reaction product is from about 74% to about 80% by weight of the sulfonating agent used.

8. The process as in claim 3, in which the total amount of water added, including that in the alkaline solution, is from about 74% to about 80% by weight of the sulfonating agent used.

9. The process of producing mineral oil sulfonic acids which comprises sulfonating a mineral oil with oleum, adding water to the reaction product and then adding dilute aqueous alkaline solution, the total amount of water, including that in the alkaline solution, being from about 74% to about 80% by weight of the oleum used and the amount of alkaline material being equivalent to about one part of caustic soda for each twenty parts of oleum, and separating the sulfonic acids from the resulting mixture by stratification.

10. The process of producing mineral oil sulfonic acids which comprises subjecting a mineral oil to sulfonation and separating the sulfonic acids from excess sulfuric acid by washing the mixture thereof with aqueous alkaline solution in an amount insufficient to neutralize the excess sulfuric acid in the reaction product and stratifying at a temperature approximating 185° F.

HAROLD JAY ROBERTSON.